United States Patent
Planca et al.

(10) Patent No.: US 6,616,324 B1
(45) Date of Patent: Sep. 9, 2003

(54) FOOD PROCESSING APPLIANCE WITH STORABLE TOOL SUPPORT

(75) Inventors: Rinaldo Planca, Sao Bernardo do Campo (BR); José Carlos Veneziano, Santana (BR)

(73) Assignee: Arno S.A., Sao Paulo (BR)

( * ) Notice: Subject to any disclaimer, the term of this patent is extended or adjusted under 35 U.S.C. 154(b) by 0 days.

(21) Appl. No.: 10/311,969
(22) PCT Filed: Jun. 22, 2000
(86) PCT No.: PCT/IB00/00833
§ 371 (c)(1), (2), (4) Date: Dec. 23, 2002
(87) PCT Pub. No.: WO01/97667
PCT Pub. Date: Dec. 27, 2001

(51) Int. Cl.[7] .................. A47J 43/046; A47J 43/07; B01F 7/00; B01F 7/16; A23L 1/00
(52) U.S. Cl. .................. 366/205; 099/348; 099/492; 241/101.2; 241/282.1; 366/314
(58) Field of Search .................. 099/348, 484, 099/492, 537, 538, 509–513; 366/199–206, 144–146, 209, 210, 314, 601; 241/37.5, 92, 199.12, 282.1, 282.2, 277, 101.2, 189.2

(56) References Cited

U.S. PATENT DOCUMENTS

| | | | | |
|---|---|---|---|---|
| 3,786,999 A | * | 1/1974 | Cabell | 241/282.1 |
| 4,087,053 A | * | 5/1978 | Voglesonger | 241/282.1 |
| 4,733,827 A | * | 3/1988 | Williams | 241/101.2 |
| 5,289,760 A | * | 3/1994 | Barradas | 99/348 X |
| 5,338,111 A | * | 8/1994 | Trocherie et al. | 366/205 |
| 5,584,577 A | * | 12/1996 | Thies | 366/205 |
| 5,809,872 A | * | 9/1998 | Sundquist | 99/348 X |
| 6,193,407 B1 | * | 2/2001 | Kubicz | 366/205 |
| 6,350,053 B1 | * | 2/2002 | Morin | 366/205 |
| 6,513,966 B1 | * | 2/2003 | Gort-Barten et al. | 366/205 X |
| 6,532,863 B1 | * | 3/2003 | Lee | 99/348 |

FOREIGN PATENT DOCUMENTS

| | | |
|---|---|---|
| EP | 0 669 095 | 8/1995 |
| JP | 9-23985 | 1/1997 |
| WO | WO00/13563 | 3/2000 |

* cited by examiner

Primary Examiner—Timothy F. Simone
(74) Attorney, Agent, or Firm—Browdy and Neimark, P.L.L.C.

(57) ABSTRACT

A food processing appliance such as a blender comprises a container (22) and a base (20) housing an electric motor for driving the tool support assembly (2) which comprises a generally conical support (15) which is open inside and flares out to a enlarge periphral edge part which is removably securable in said opening, the narrow end of the conical support bearing a food processing tool (24). The motor being housed in a compartment (60) in the base space up from the bottom, a storage compartment (70) for storing a tool support assembly (2) of the defined type when the assembly is nit in use, the storage compartment (70) having a recess for receiving therein a tool support assembly placed with its enlarge part down and with its narrow end up.

11 Claims, 4 Drawing Sheets

FOOD PROCESSING APPLIANCE WITH STORABLE TOOL SUPPORT

The invention relates to a food processing appliance comprising a container removably mounted on a separate base, the container being associated with a food processing tool support assembly removably secured in an opening provided in the bottom of the container, the separate base housing an electric motor for driving the tool support assembly.

The appliance is typically a blender, grinder or other food processor having a container for example in the form of a jug for preparing foods.

The food processing tool of appliances such as blenders rotates at high speeds, up to 20 000 rpm. In this kind of appliance the food processing tool is secured to a rotary axle mounted on the container's or jug's bottom and the container or jug is secured removably on the motor base.

In a known food processing appliance, which is described in WO 00/13563, and which corresponds to the pre-characterizing part of claim 1, the tool support assembly comprises a generally conical support which is open inside and flares out from a narrow end part to an enlarged end part which is removably securable in the container's opening. A rotary axle is mounted axially through the generally-conical support, this axle having a first extremity in the enlarged end part of the generally conical support, which first extremity bears an engaging element able to be driven by the electric motor when the container is mounted on the base, and a second extremity at the narrow end part of the generally conical support, the axle's second extremity bearing a food processing tool. The motor is arranged so that it is coaxial with the tool support assembly when mounted, the motor being housed in a compartment in the base spaced up from the bottom of the base, there being a cavity between the motor compartment and the surrounding lateral walls of the base.

Further examples of food processing appliances of similar design, all having generally conical tool supports, are described in U.S. Pat. No. 5,360,176; FR 1 329 312; FR 1 332 971; FR 1 145 914; DE 1 037 088 and FR 2 492 246.

In these appliances, the removability of the conical tool holders is primarily intended to facilitate washing, due to the fact that the container can be better and easier washed, by hand or in a washing machine, without the tool support assembly. It is also easier to wash the tool support assembly when it is separated from the container.

It has already been proposed to provide various food processing appliances with a plurality of interchangeable tools which are stored when not in use. For instance, EP-A-0 669 095 describes a food processor having side-by-side arranged compartments, the processor having in the lower part of its bottom a flat drawer for storing cutting blades or discs when these are not in use. A tool storage arrangement like this has been commercialised by Senur-Europe under the Trademark Arnica.

U.S. Pat. No. 4,733,827 describes a storage container with a transparent lid specially-designed for storing rotary food processing tools and accessories. This container is in the form of a separate casket for receiving two tool blades and their components when dismantled. It is designed to be kept separately from the food processor and is not designed for generally conical tool supports.

It can readily be appreciated that for appliances having a generally conical tool holder, in particular those supporting a tool that projects laterally from the support, there would be a problem in storing a spare tool holder of this type when it is not in use. Usually, the appliance is a blender whose base is no wider than—or only marginally wider than—the upper container. The conical shape of the tool holder and the protruding tool mean that the support cannot be stored in appliances of known design. As the base houses the tool-driving motor, this leaves insufficient space for storage of a conical tool support. Also, care must be taken to leave place for vents and channels for a air flow to cool the electrical motor.

The prior art discussed above offers no solution to this problem. The use of an external storage container like in U.S. Pat. 4,733,827, but specially adapted to the conical tool support would be a possibility, as would dismantling the tool from the conical support, to facilitate storage, but both of these expedients involve inconveniences. Flat drawers like in EP-A-0669095 can only accommodate discs or other flat tools, not conical tool supports. JP 09 023985 discloses a blender having a tool storage compartment provided on the side of the motor compartment.

The aforementioned problem is solved according to the invention by providing in the bottom of the base a storage compartment specially designed to store a tool support assembly of the defined type when the assembly is not in use.

According to the invention, this storage compartment is configured to receive a tool support assembly with its enlarged end part facing down and with its narrow end part facing up, the axis of the stored tool support assembly being laterally offset from the axis of the motor. An innermost-disposed portion of the enlarged end part of a stored tool support assembly is located under the motor compartment which has a recess located in its underneath part. This recess forms part of the storage compartment and is arranged so that when a tool support assembly is stored in the storage compartment, the generally conical support and its tool are accommodated partly in the recess under the motor compartment and partly under the peripheral cavity or in the lower part thereof. A movable closure member, such as a drawer or a door, is provided for allowing access to or closing the storage compartment. This closure member is movable between an open position allowing the insertion into and the removal from the storage compartment of a tool support assembly, and a closed position in which at least a part of the closure member is flush with adjacent portions of the walls of the base.

In one embodiment, the movable closure member is part of a drawer slidably received in the bottom of the base. A drawer specially-designed for this purpose comprises a drawer bottom, side walls, a rounded front wall and an inclined rear wall. The side walls extend up from the drawer bottom and have parallel spaced apart top edge parts, for slidably engaging in the base. The drawer's rounded front wall extends up from a curved front of the drawer bottom to above these top edge parts of the side walls. The inclined rear wall extends up from the rear of the base, the inclined rear wall having a central portion below the top edge parts of the side walls. The rounded front wall is flush with adjacent portions of the walls of the base when the drawer is pushed in the base in the closed position. The bottom of the drawer is dimensioned to hold a tool-support thereon with its enlarged end part placed down, the front side and back walls of the drawer forming a recess for receiving a tool holder to be stored, allowing a tool support to be inserted and removed when the drawer is pulled out of the base to the open position.

The rounded front wall of the drawer can be provided in its upper part with a central aperture, and the bottom of the base has a projection or a button of a lock which fits in this aperture when the drawer is in the closed pushed-in position. The drawer's front wall further comprises under this aperture a gripping recess, arranged so a user can grip it while pushing against said projection to pull the drawer out.

The bottom of the motor compartment may comprise a cage protruding down under the motor shaft so as to protect the bottom end of the shaft. Preferably this cage is off-centered from the axis, generally behind it in the direction of pushing in the drawer, and is arranged so that when the drawer is moved to and from its closed position, the lower central part of the drawer's rear wall slides under the cage. The cage can presents vent openings for the passage of air cooling.

When the tool support carries on its narrow end part a food processing tool comprising at least one arm that projects laterally and upwardly from this narrow end part, the base can have apertures which are specially arranged for receiving these projections. For example, a portion of the base that receives the upper part of the drawer has a central downward projection flanked by upwardly-extending apertures, arranged so that when the drawer is pushed in or out the narrow end part of a stored tool support passes under this downward projection whereas the tool's laterally and upwardly projecting arm(s) pass through the upwardly-extending apertures.

The food processing appliance according to the invention usually includes two tool support assemblies having essentially identical conical supports, but carrying different tools. For example, the tools of the two assemblies each have a plurality of laterally-projecting angulated tool arms, the arms of one tool having smooth edges, the arms of the other tool including at least one serrated edge. One type of tool support assembly has two pairs of laterally-projecting angulated tool arms in cruciform arrangement, a first pair of opposing arms projecting upwardly from the narrow end part, and a second pair of opposing arms projecting downwardly from the narrow end part.

Preferably, the tool support assembly is removably attached to the container by locking means actuable to install or remove a tool support assembly only when the container is removed from the base.

In summary, the invention provides a food processor of the defined type wherein the space in the lower base, which is necessarily confined because it houses the motor, has been astutely redesigned to allow storage of the relatively voluminous conical tool support and tool, and its easy insertion and removal, without any need to dismantle the tool from its conical support, and without any or with only minor over-dimensioning of the base which can retain its traditional outer shape. The food processor can thus be sold with two interchangeable conical tool supports and tools, one of which can conveniently be stored in the base when not in use, without a need for a separate storage container.

The invention will now be described in more detail by way of example, with reference to and as shown in the accompanying drawings, in which.

Figure 1:
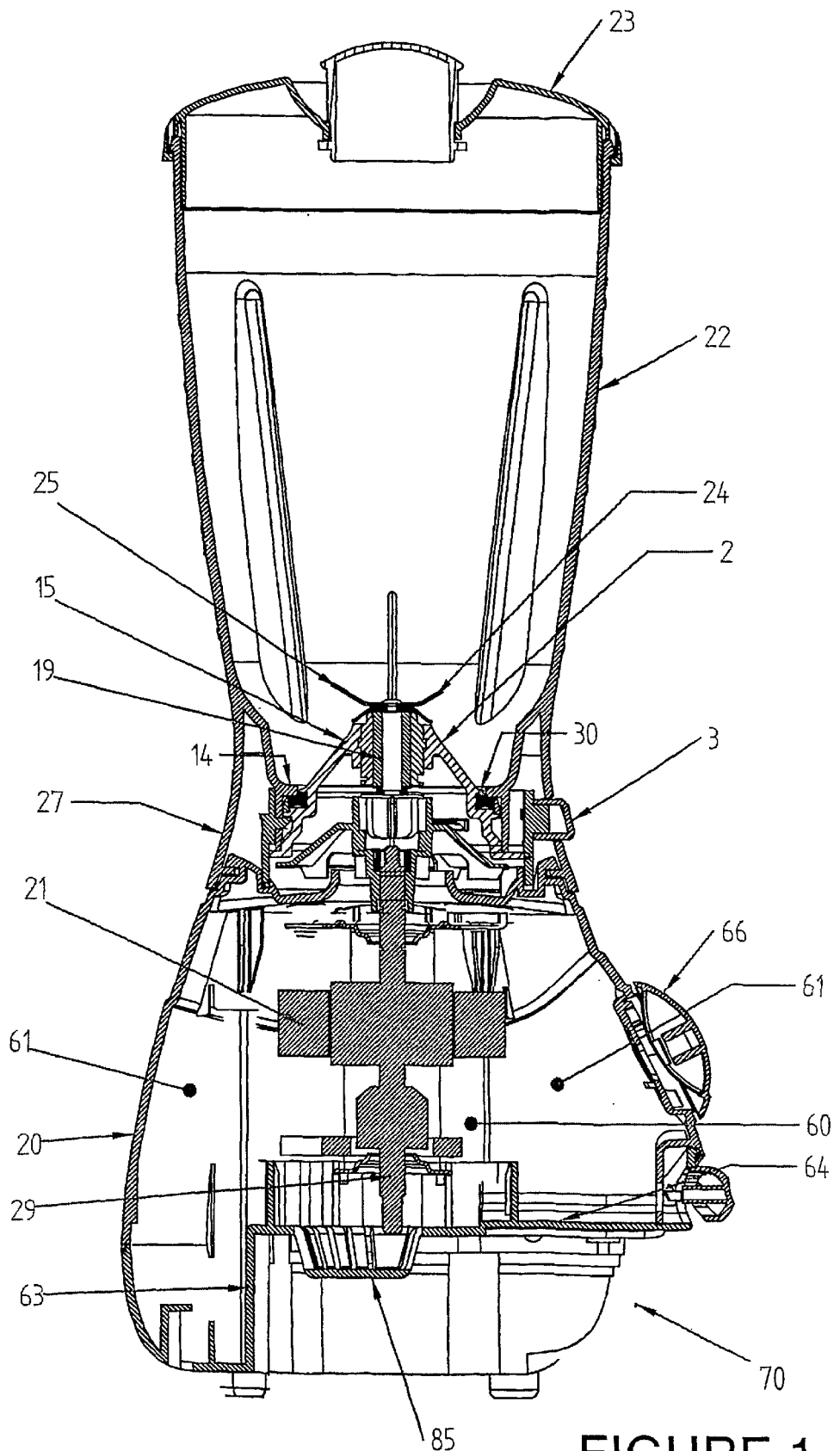
FIG. 1 is a sectional elevation of an appliance comprising a removable food processing tool support system, with the storage drawer removed.
Figure 2:
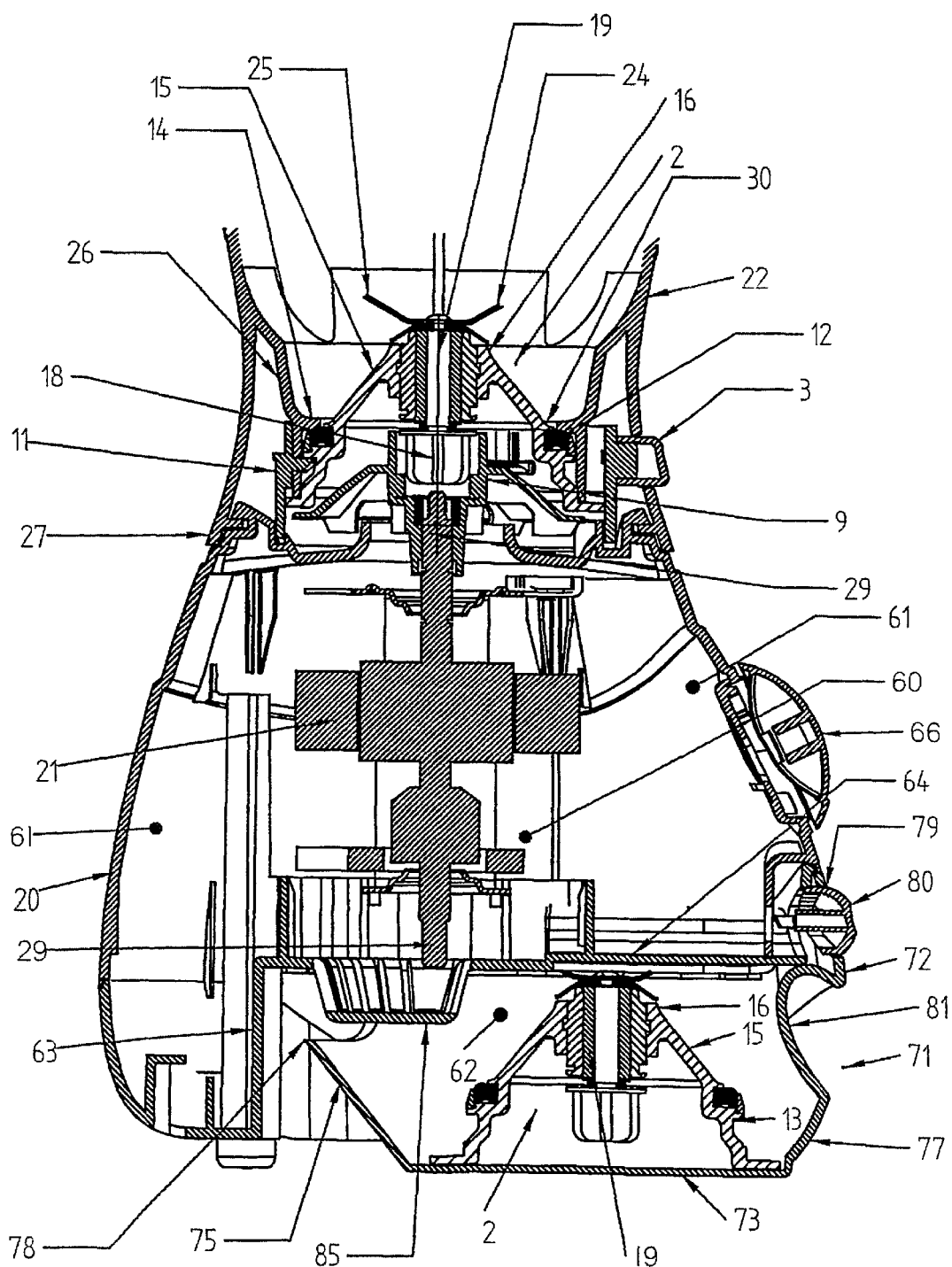
FIG. 2 is a sectional elevation of the lower part of the appliance shown at FIG. 1, showing with more details the food processing tool support removably mounted in the lower part of the upper container, and showing the drawer in its storage position with a tool support stored therein.

The blender shown in FIGS. 1 and 2 comprises a motor base 20 including an electric motor 21, a container or jug 22 with an open top, and also a lid 23 to close the container 22, the container 22 being removably mounted on the motor base 20. The container 22 comprises a food processing tool support assembly 2 having a support 15 removably secured in an internal opening 30 provided in the bottom of the container 22, and a rotary axle 19 mounted through the support 15, bearing at one of its extremities a coupling element 18 able to be driven by the electric motor 21 when the container 22 is mounted on the base 20 and at its other narrow extremity 16 a food processing tool 24. The food processing tool 24 comprises two upwardly outward inclined blades 25.

The food processing tool support assembly 2 is maintained against a flange 14 integral with the container 22 by locking means actionable by a control button 3 mounted on the container 22.

The base 20 comprises a coupling element 9 attached to the motor axle 29 and able to couple with an engaging element 18 of the axle 19 which turns within the internal bearing (not shown) of the mentioned assembly 2 and upon which the blades 25 which turn with it are attached. Thus, the coupling element 9 and the engaging element 18 form an elastic coupling sleeve between the motor axle 29 and the support assembly axle 19.

Figure 3:
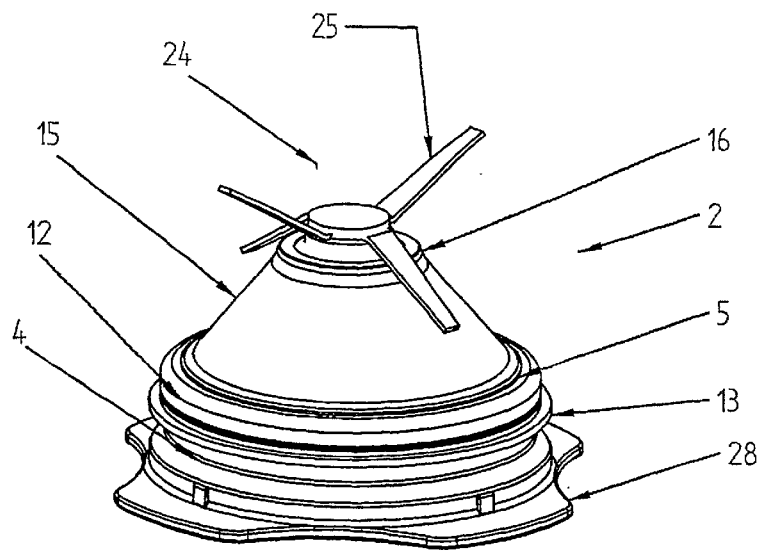
FIG. 3 is a perspective view of the food processing tool support assembly shown in FIG. 2.

The lower part of container 22 comprises an inner skirt 26 surrounded by a flexible belt 11, and an outer skirt 27 with a through opening receiving the button 3 projecting from the external side of the container 22, for access of the user. The button 3 is near the base of the container 22. The button 3 is attached to a rectilinear length of the belt 11. The button 3 can be pressed by the user, moving through the mentioned opening, however, without unfastening from the container 22. A ring groove 4 is provided on the support 15 (FIG. 3). A lock having a lower beveled edge is provided on the belt 11, this lock being housed in groove 4.

Locking means of the container 22 on the base 20 such as bayonet locking means (not shown) are provided. The base 20 also comprises a stopper able to limit the path of button 3. A further control button 66 is provided on the base 20 for controlling the motor 21.

The container 22 has all around its lower internal circular opening 30 a surrounding flange 14 which contacts a sealing ring 12 of deformable material, provided on the support 15. The ring 12 is pressed by the flange 14 as long as the assembly 2 is correctly installed in the container 22, thus providing an efficient sealing. The flange 14 forms an annular support area receiving the sealing ring 12 of support assembly 2.

FIG. 3 shows a perspective view of the support assembly 2 outside of the container 22. The support 15 is a round part which is hollow, frustoconical in its upper section, forming an open cavity in its lower section where the engaging element (not shown in this Figure) is to be located. The support 15 also presents a base flange 28 with indents to prevent the support to turn within the jug 22. An upwardly opened ring groove 5 is provided around the support 15. The groove 5 is surrounded by a wall having an upper outer beveled edge, this wall forming the enlarged end part of the support 15. The groove 5 houses the sealing ring 12. The ring groove 4 housing the lock (not shown in this Figure) is provided between the groove 5 and base flange 28.

The motor 21 is arranged so that it is coaxial with the tool support assembly 2 when the latter is mounted, the motor 21 being housed in a compartment 60 in the base 20 spaced up from the bottom of the base 20, there being a cavity 61 between the motor compartment 60 and the surrounding lateral walls of the base 20.

As so far described, the blender corresponds substantially to that of WO 00/13563, which describes in greater detail the arrangement for releasably securing the support 15 in the container 22 allowing the support 15 to be removed and inserted when the container 22 is separated from the base 20, and variations of this arrangement.

According to the invention, the lower part of the base 20 has been redesigned to provide therein a storage compartment 70 which underlies the motor compartment 60 and the cavity 61, opening into one side of the base 20. The motor compartment 60 is spaced up from the bottom of the base 20 by a wall 63 and rests on a generally horizontal separator 64 providing a recess 62 under the motor compartment 60.

The storage compartment 70 is configured to receive a conical tool support assembly 2 with its enlarged end part 13 facing down and with its narrow end part 16 facing up. The axis 19 of the stored tool support 2 assembly is laterally offset from the axis of the motor 21. An innermost-disposed portion of the enlarged end part 13 of a stored tool support assembly 2 is located directly under the motor compartment 60 in the recess 62. This recess 62 forms part of the storage compartment 70 and is arranged so that when a tool support 2 assembly is stored in the storage compartment 70, generally conical support 15 is accommodated partly in the recess 62 under the motor compartment 60 and partly under the peripheral cavity 61. A movable closure member, such as a drawer 71 or alternatively a door, is provided for allowing access to or closing the storage compartment 70. This closure member exemplified by drawer 71 is movable between an open position (shown in FIG. 5) allowing the insertion into and the removal from the storage compartment 70 of a tool support assembly 2, and a closed position (shown in FIG. 2) in which a front wall 72 of the drawer 71 is flush with adjacent portions 65 of the walls of base 20.

Figure 4:
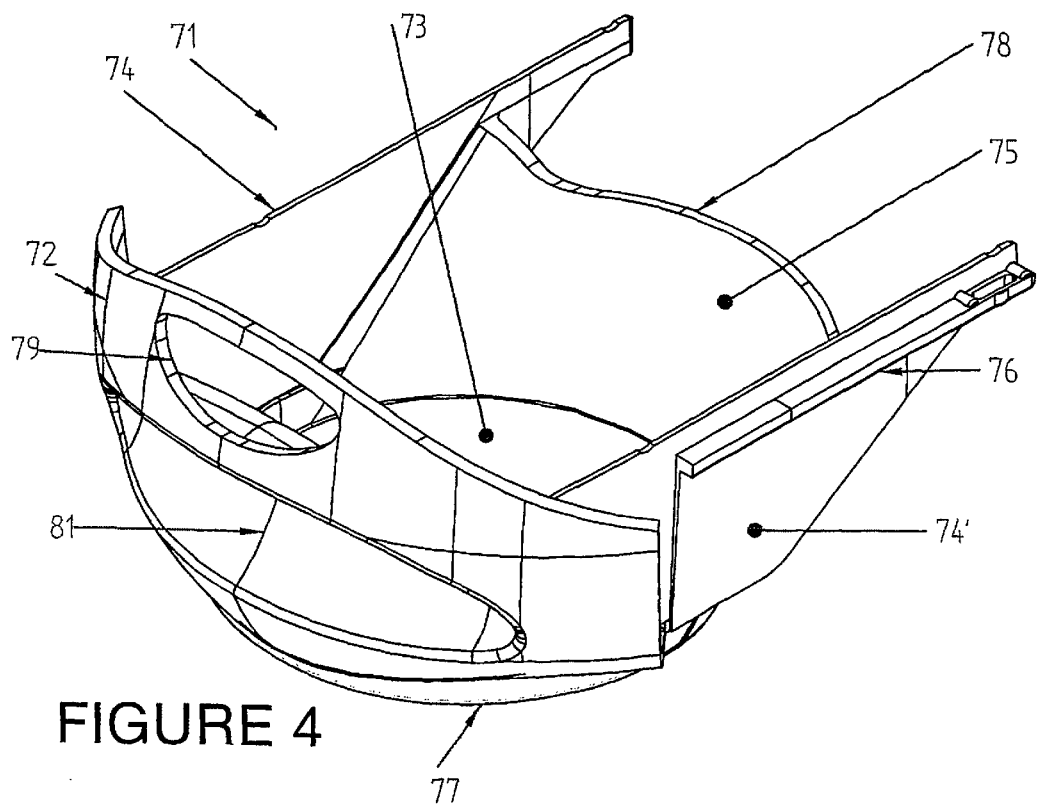
FIG. 4 is a perspective view of the drawer, removed from the base of the appliance.
Figure 5:
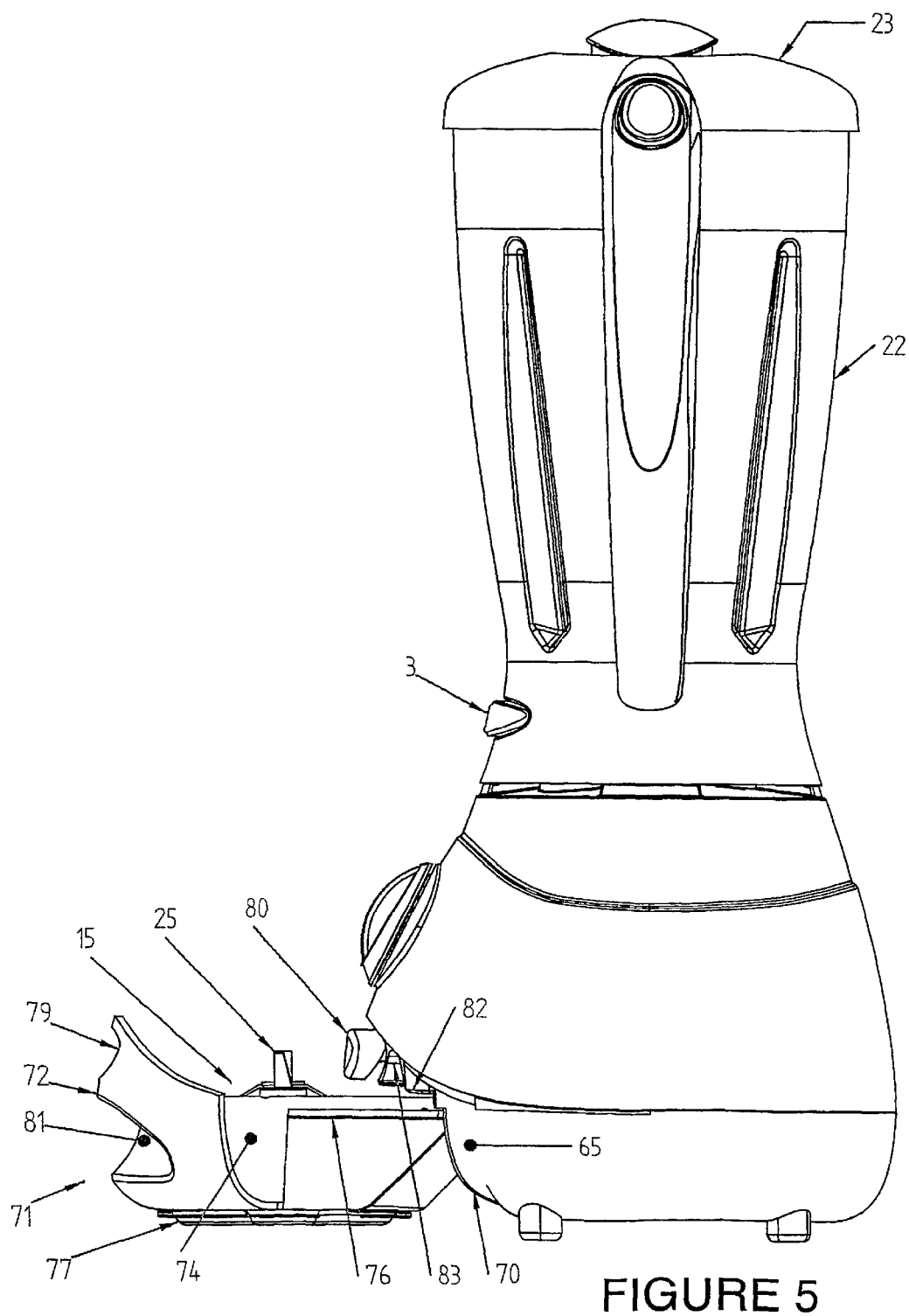
FIG. 5 is a side view of the appliance shown from the opposite side to FIG. 1, and with the drawer in its pulled-out open position.

This drawer 71 as shown on FIGS. 4 and 5, specially-designed for this purpose, comprises a flat drawer bottom 73, side walls 74, a rounded front wall 72 and an inclined rear wall 75. The side walls 74 extend up from the bottom 73 and have parallel spaced apart top edge parts 76, which could be integral with the side wails 74 but in this example are on top of separate outer side wall segments 74', slidably mounted in corresponding recesses in the base 20. The drawer's rounded front wall 72 extends up from a curved front edge 77 of the bottom 73 to above the top edge parts 74 of the side walls. The inclined rear wall 75 extends up from the rear of the bottom 73, this inclined rear wall having a recessed central portion 78 below the top edge parts 76 of the side walls. The drawer's rounded front wall 72 is flush with the adjacent portions 65 of the walls of the base 20 when the drawer is pushed in the base 20 in the closed position. The bottom 73 of drawer 71 is shaped and dimensioned to hold a tool-support 15 thereon with its enlarged end part 16, and in particular its lower base flange 28, placed down, the front side and back walls of the drawer 71 forming a recess for receiving a tool support 15 to be stored, allowing a tool support 15 to be inserted and removed when the drawer 71 is pulled out to the open position, shown in FIG. 5.

The drawer 70 may be locked in closed position by a locking system comprising an outside protubering button 80. In particular, the rounded front wall 72 can be provided in its upper part with an oval central aperture 79, thru which passes the button 80 which fits in this aperture 79 when the drawer 71 is in the closed pushed-in, as shown in FIG. 2. The drawer's front wall 72 further comprises under this aperture 79 a gripping recess 81, arranged so a user can grip it while pushing against said unlocking button 80 to release and open the drawer 71 by pulling it out.

The bottom of the motor compartment 60 comprises a cage 85 protruding down under the motor compartment 60 so as to protect the bottom end of the shaft 29. This cage 85, adjacent the recess 62, is off-centered from the axis, behind it in the direction of pushing in the drawer 71, and is arranged so that when the drawer 71 is moved to and from its closed position, the lower central part 78 of the drawer's rear wall 75 slides under the cage 85 as can be best seen on FIG. 2.

This cage 85, together with wall 63 and horizontal separator 64, isolates the motor even when the drawer 71 is removed. This ensure protection of the user from possible electric shock or from being hurt by moving mechanical parts when said user introduce fingers in the storage compartment 70.

The motor base rests on small feets to ensure an easy passage of air flow under the base around the drawer when in place. In addition, there is a first vertical space between the upper wall 63 and inclined rear wall 75 of the drawer, and a second horizontal space between the upper edge of inclined rear wall 75 and horizontal separator 64. More over, the cage 85 presents openings regularly spaced. These spaces and openings allows the flow of a strong cooling air sucked by cooling fan which is part of the coupling element 9. This improves the cooling action around the stator's and rotor's laminations and windings as well as around the motor frame, in particular its bearing. This ensure a better performance and an increased life-span even with the presence of the drawer as per the invention.

When the conical tool support 15 carries on its narrow end part a food processing tool 24 comprising at least one arm 25 that projects laterally and upwardly from this narrow end part, the base 20 can have apertures 83 which are specially arranged for receiving these projecting arms 25, when the drawer is pushed in. For example, a portion of the base 20 that receives the upper part of the drawer has a central downward projection 82 flanked by sidewardly and upwardly-extending curved apertures 83, arranged so that when the drawer 71 is pushed in or out the narrow end part 16 of a stored tool support 15 passes under this downward projection 82 whereas the tool's laterally and upwardly projecting arm(s) 25 pass through the upwardly-extending curved apertures 83.

One food processing appliance according to the invention usually includes two interchangeable tool support assemblies 15 having essentially identical conical supports 15, but carrying different tools 24. For example, the tools of the two assemblies each have a plurality of laterally-projecting angulated tool arms 25, the arms of one tool having smooth edges suitable for blending foods, the arms of the other tool including serrated edges, suitable for crushing ice. One particular type of tool support assembly has two pairs of laterally-projecting angulated tool arms 25 in cruciform arrangement, a first pair of opposing arms 25 projecting upwardly from the narrow end part 16, and a second pair of crossing-over opposing arms 25 projecting downwardly from the narrow end part 16 (see FIG. 5). When a tool support assembly 15 like this is to be stored in the drawer 71, it is arranged as shown in FIG. 5 with the upwardly-projecting arms 25 sideways so they fit in the apertures 83 when the drawer 71 is pushed in, whereas its inner downwardly projecting arm 25' fits under the projections 80/82.

Having described some preferred examples, it must be understood that the scope of the present invention covers possible variations, only being limited by the scope of the claims which are intended to include possible equivalents.

We claim:

1. Food processing appliance comprising a container (22) removably mounted on a separate base (20), the container (22) being associated with a food processing tool support assembly (2) removably secured in an opening (30) provided in the bottom of the container (22), the separate base (20) housing an electric motor (21) for driving the tool support assembly, wherein the tool support assembly (2) comprises a generally conical support (15) which is open inside and flares out from a narrow end part (16) to an enlarged end part (13) which is removably securable in said opening (30), a rotary axle (19) being mounted axially through the generally-conical support (15), said axle having a first extremity in the enlarged end part (13) of the generally conical support (15), said first extremity bearing an engaging element (18) able to be driven by the electric motor (21) when the container (22) is mounted on the base (20), said axle having a second extremity at the narrow end part (16) of the generally conical support (15), said second extremity bearing a food processing tool (24), the motor (21) being arranged coaxially with the tool support assembly (2) when mounted, the motor being housed in a compartment (60) in the base (20), there being a cavity (61) between the motor compartment (60) and the surrounding lateral walls of the base (20), the base (20) comprising, at its bottom, a storage compartment (70) for storing a tool support assembly (2) of the defined type when the assembly is not in use, the storage compartment (70) being configured to receive therein a tool support assembly (2) with its enlarged end part (13) facing down and with its narrow end part (16) facing up, the axis of the stored tool support assembly (2) being laterally offset from the axis of the motor (21), a movable closure member (71) being provided for allowing access to or closing the storage compartment (70), said closure member (71) being movable between an open position allowing the insertion into and the removal from the storage compartment (70) of a tool support assembly (2), and a closed position in which at least a part (72) of the closure member (71) is flush with adjacent portions of the walls of the base (20), characterized in that the motor compartment (60) is spaced up from the bottom of the base (20), a recess (62) being provided under the motor compartment (60), the recess (62) forming part of the storage compartment (70), the storage compartment (70) underlying the motor compartment (60) and the cavity (61), the generally-conical support (15) carrying on its narrow end part (16) a food processing tool (24) comprising at least one arm (25) that projects laterally and upwardly from the narrow end part (16), the recess (62) being arranged so that when a tool support assembly (2) is stored in the storage compartment (70), the generally conical support (15) and its tool (24) are accommodated partly in said recess (62) under the motor compartment (60) and partly under said peripheral cavity (61) or in the lower part thereof, an innermost-disposed portion of the enlarged end part (13) of the stored tool support assembly (2) being located under the motor compartment (60), the base (20) having at least one aperture(s) (83) specially arranged for receiving the projecting arm(s) (25).

2. Food processing appliance according to claim 1, wherein the movable closure member is part of a drawer (71) slidably received in the bottom of the base (20).

3. Food processing appliance according to claim 2, wherein the drawer (71) comprises a drawer bottom (73), side walls (74), a rounded front wall (72) and an inclined rear wall (75), the side walls (74) extending up from the drawer bottom (73) and having parallel spaced apart top edge parts (76), the rounded front wall (72) extending up from a curved front (77) of the drawer bottom (73) to above said top edge parts (76), and the inclined rear wall (75) extending up from the rear of the drawer bottom (73), the inclined rear wall (75) having a central portion (78) below said top edge parts (76), the rounded front wall (72) being flush with adjacent portions of the walls of the base (20) when the drawer is pushed in the base in the closed position, the drawer bottom (73) being dimensioned to hold a tool-support (2) thereon with its enlarged end part (13) placed down, the front side and rear walls (72, 74, 75) forming a recess for receiving a tool support assembly (2) to be stored, allowing insertion and removal of a tool support assembly when the drawer (71) is pulled out to the open position.

4. Food processing appliance according to claim 3, wherein the rounded front wall (72) of the drawer has in its upper part a central aperture (79) and the corresponding part of the base (20) has a projection (80) which fits in said aperture when the drawer (71) is in the closed pushed-in position, the front wall (72) further comprising under said aperture a gripping recess (81) for facilitating opening of the drawer, arranged so a user can grip said recess (81) while pushing against said projection (80) to pull the drawer out.

5. Food processing appliance according to claim 3, wherein the bottom of the motor compartment (60) comprises a cage (85) under the motor shaft (29), the lower central part (78) of the drawer's rear wall (75) sliding under said cage (85) when the drawer (71) is moved to and from its closed position.

6. Food processing appliance according to claim 3, wherein a portion of the base(20) receiving the upper part of the drawer (71) has a central downward projection (82) flanked by upwardly-extending apertures (83), arranged so that when the drawer (71) is pushed in or out the narrow end part (16) of a stored generally-conical support (15) passes under said downward projection (82) whereas the tools laterally and upwardly projecting arm(s) (25) pass through the upwardly-extending apertures.

7. Food processing appliance according to claim 1, wherein the movable closure member (71) is a door hinged to the base.

8. Food processing appliance according to claim 1, which includes two tool support assemblies (2) having essentially identical conical supports (15) carrying different tools (24).

9. Food processing appliance according to claim 8, wherein the tools (24) of the two assemblies (2) each have a plurality of laterally-projecting angulated tool arms (25), the arms of one tool having smooth edges, the arms of the other tool including at least one serrated edge.

10. Food processing appliance according to claim 1, comprising a tool support assembly (2) having two A pairs of laterally-projecting angulated tool arms in cruciform arrangement, a first pair of opposing arms (25) projecting upwardly from the narrow end part (16), and a second pair of opposing arms (25') projecting downwardly from the narrow end part (16).

11. Food processing appliance according to claim 1, wherein the tool support assembly (2) is removably attached to the container (22) by locking means (3,11) actuable to install or remove a tool support assembly (2) only when the container (22) is removed from the base (20).

* * * * *